(No Model.) 3 Sheets—Sheet 1.

G. G. BLUNT.
GRAIN DRILL.

No. 254,452. Patented Mar. 7, 1882.

Witnesses,
Henry Frankfurter
J. W. Nichols

Inventor,
George G. Blunt
per F. F. Warner
his Attorney.

N. PETERS. Photo-Lithographer, Washington, D. C.

(No Model.)   3 Sheets—Sheet 2.
G. G. BLUNT.
GRAIN DRILL.
No. 254,452.  Patented Mar. 7, 1882.
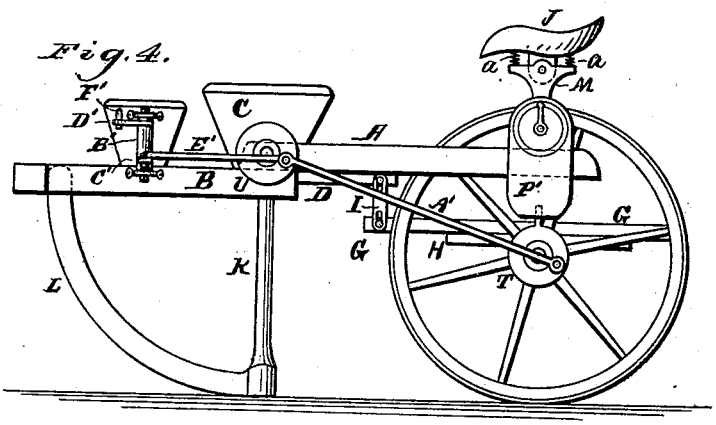
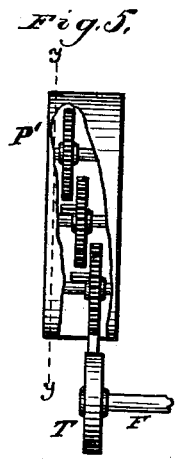 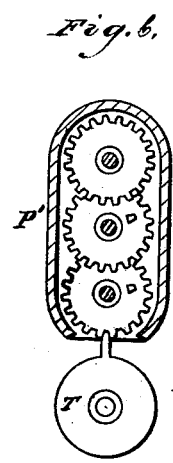 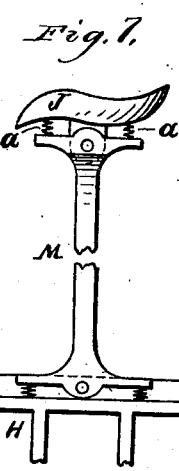 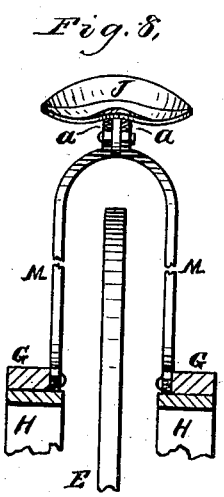
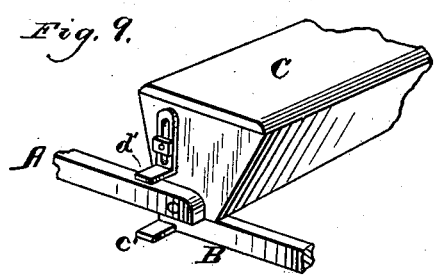

(No Model.)  3 Sheets—Sheet 3.

G. G. BLUNT
GRAIN DRILL.

No. 254,452. Patented Mar. 7, 1882.

Witnesses.
Henry Frankfurter
J. W. Nichols

Inventor.
George G. Blunt
per F. F. Warner
his Attorney.

UNITED STATES PATENT OFFICE.

GEORGE G. BLUNT, OF CHICAGO, ILLINOIS.

GRAIN-DRILL.

SPECIFICATION forming part of Letters Patent No. 254,452, dated March 7, 1882.

Application filed October 3, 1881. (No model.)

*To all whom it may concern:*

Be it known that I, GEORGE G. BLUNT, of Chicago, in the county of Cook and State of Illinois, have invented certain new and useful Improvements in Grain-Drills, of which the following, in connection with the accompanying drawings, is a specification.

Figure 1:
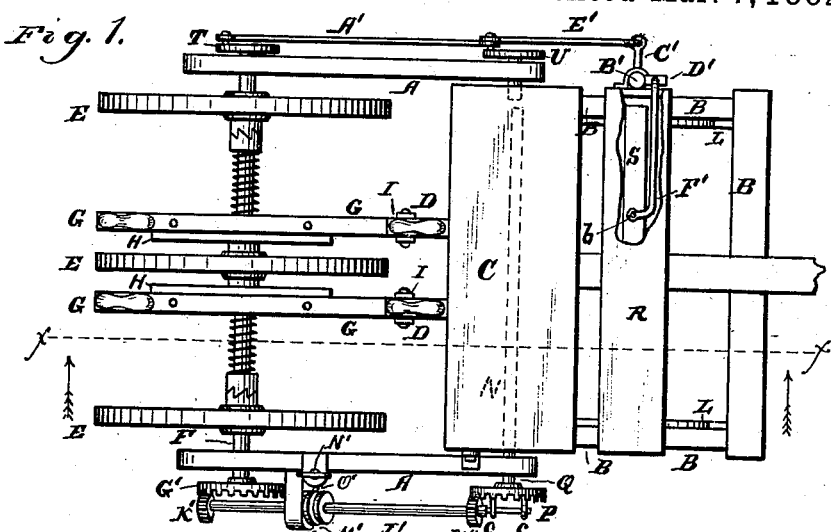
Figure 2:
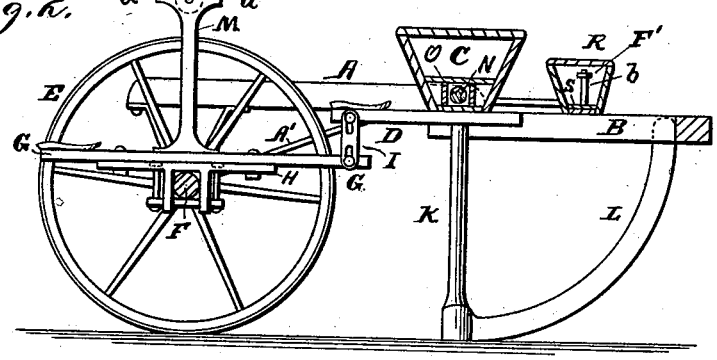
Figure 3:
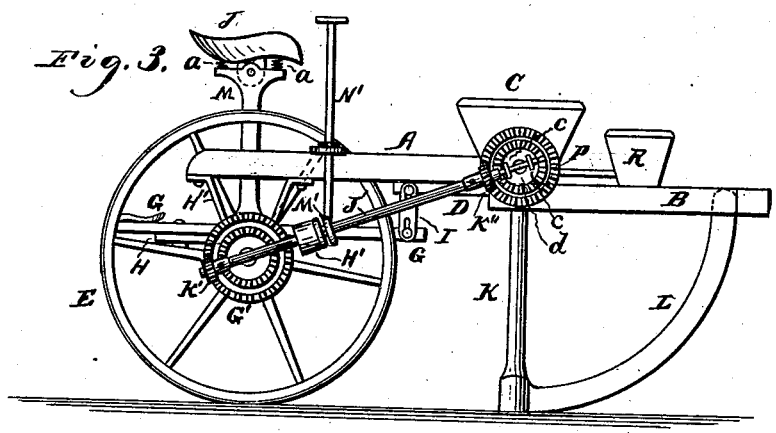
Figure 10:
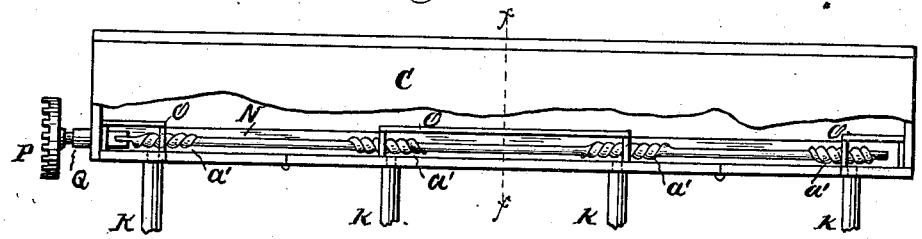
Figure 11:
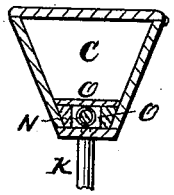
Figure 12:
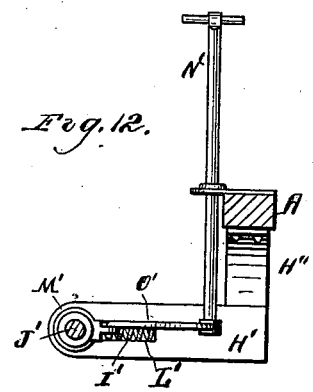
Figure 13:
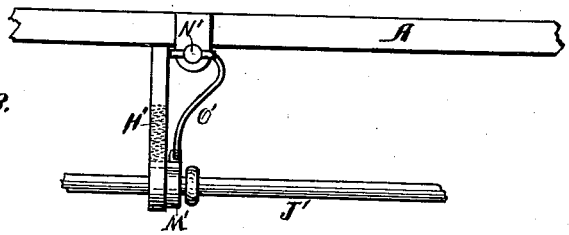

In the drawings, Figure 1 is a top or plan view of a grain-drill embodying my invention. Fig. 2 is a section in the plane of the line $x\ x$ of Fig. 1. Fig. 3 is a side elevation of one side of the drill. Fig. 4 is a side view of the other side. Fig. 5 is a detail of the registering apparatus. Fig. 6 is a section in the plane of the line $y\ y$ of Fig. 5. Fig. 7 is a side view of the seat and its standard. Fig. 8 is a front view of the same. Fig. 9 is a detail, in perspective, of the means employed for regulating the position of the seed-box. Fig. 10 is a side view of the seed-box, partly broken away to show the interior. Fig. 11 is a section in the plane of the line $x'\ x'$ of Fig. 10, and Figs. 12 and 13 are details of the means employed for throwing the feed-shaft in and out of gear with the mechanism for rotating it.

Like letters of reference indicate like parts.

A represents the main frame.

B is the draft-frame, which is hinged or pivoted to the frame A, so as to be capable of being tilted or rocked vertically.

C is a seed-box, rigidly applied to the frame B.

D D are treadle-bars, extending rearwardly from the box C.

E E are the draft-wheels, and F is their axle.

G G are treadle-bars, and H H are boxes to which they are respectively applied. The boxes H H are mounted loosely on the shaft F, so that the treadles G G may be tilted or rocked up and down.

I I are links connecting the forward ends of the treadles G G to the rear ends of the treadles D D.

J is the driver's seat.

K K are the seed-tubes, and L L are the cutters or drills. The seed-tubes and the cutters or drills are connected to each other and to the frame B, as shown, and the said tubes communicate with the interior of the seed-box.

It will be perceived that if the driver should place his feet upon the treadles D D and press down the rear ends thereof the cutters will be pressed into the soil, and that if he should depress the rear ends of the treadles G G the cutters will be raised. In this manner he may regulate the depth at which the cutters shall run in the soil.

To further facilitate the operation of raising and lowering the cutters, I mount the seat pivotally upon a standard, M, which is forked to straddle the central draft-wheel and to rest or bear upon the boxes H H, and between the top of this standard and the under side of the seat I arrange springs $a\ a$, to render the seat yielding. By this means the seat may be tilted forward and backward, and the weight of the driver being thus easily shifted more or less forward or back of the center of the boxes H H, to which the treadles G G are attached, his weight will be utilized in tilting the said treadles up or down for the purpose of regulating the depth of the cutters in the soil. The lower end of the standard M may be pivoted to its seat in like manner as the seat J is applied to the upper end of the standard, all of which is clearly illustrated in Figs. 7 and 8.

N is a rotary feed-shaft in the box C, and O O are removable covers or interior boxes covering portions of the said shaft, and through the ends of these covers the shaft passes, so that it and the covers may be removed together. The purpose of the covers O O is to prevent the grain in the box C from passing into the tubes K K, except as it is fed thereto by the shaft N. Those parts of the shaft N which enter the ends of the covers O O are spirally flanged, as shown at $a'\ a'$, so that when the shaft is rotated the grain in the box C will be fed to the tubes K K.

P is a crown-wheel on the outer side of a short shaft, Q, which enters one end of the box C, and one end of the shaft N is jointed removably to the interior end of the shaft Q.

The shaft Q may be rotated in any suitable or well-known way, and its rotation causes a rotation of the shaft N.

It will be now perceived that the shaft N and the covers O O may be removed with facility, it being only necessary first to uncouple the shaft N from the shaft Q. By this means the box C may easily be provided with shafts of different size suited to different grains. A lateral movement of the covers O O may be prevented in any suitable way.

R is a grass-seed box arranged in front of the box C. The seed is fed through the box R by means of a slide, S, and I employ for the purpose of reciprocating this slide, and as a feature of my improvements, means substantially such as I shall now proceed to describe.

T is a crank-wheel on the shaft F, and U is a loose wheel on a shaft-axle entering the frame A.

A' is a pitman connecting the crank-pins of the wheels T and U.

B' is a vertical post or shaft turning in bearings on the end of the box R, and C' and D' are arms extending laterally from the post B'.

E' is a pitman connecting the arm C' and the crank-pin of the wheel U.

F' is a connecting-arm jointed to the arm D' and to a pin or post, b, projecting vertically from the slide S. It will now be perceived that when the shaft F is rotated the slide S will be reciprocated, owing to its connection with the means now described for producing that result. The same means may be employed in connection with the box R and its slide for distributing fertilizing material.

The means employed for driving the wheel P are as follows:

G' is a crown-wheel on one end of the shaft F.

H' is a horizontal supporting-arm, rigidly connected to a hanger, H'', depending from the frame A.

I' is a horizontal slot in the arm H'.

J' is a revolving shaft passing through the slot I', and K' and K'' are pinions on the said shaft. The pinion K' is adapted and arranged to engage with the wheel G', and the pinion K'' with the wheel P. The forward end of the shaft J' passes through ears or lugs c c, projecting from a collar, d, loosely mounted on the shaft Q.

L' is an open spiral spring in the slot I'. The action of this spring is such as to hold the shaft J' yieldingly in the outer end of the slot I', and when the said shaft is in that position the pinion K' is out of engagement with the wheel G'.

M' is a loose collar on the shaft J'.

N' is a vertical rod turning freely in a bearing applied to the frame A, and O' is a hook-shaped connecting-rod, the hooked end of which is linked to the rod N', and the other end of which is hooked into an eye in the collar M'. By turning the rod N' in such a direction that the hook O' will clasp the said rod the pinion K' will be drawn into engagement with the wheel G', and will be held there, as the action of the spring L' will then be such as to cause the hooked end of the rod O' to continue to clasp or lug the rod N'. By turning the rod N' in the opposite direction until the hooked end of the rod O' ceases to clasp it the pinion K', owing to the action of the spring L', will be thrown out of gear with the wheel G'. By this means the driving mechanism or gearing for rotating the shaft N may be thrown in and out of gear with that shaft with facility.

It will be perceived from the foregoing description that the principal features of my invention are those which relate to the means employed for controlling the depth of the cutters or drills in the soil, for rendering the feed-shaft easily removable, for reciprocating the slide in the grass-seed box, and for throwing the shaft N in and out of gear with its driving or rotating mechanism. In other respects the drill may be constructed in any well-known or suitable way adapted to my improvements.

I have here shown without particular description some features of construction also shown in Letters Patent of the United States of America, No. 139,860, dated June 17, 1873, and issued to me for the improvements therein set forth. For example, the wheels P and G' have two rows of spurs or cogs, and the pinions on the shaft J' may be shifted first to one and then to the other row of cogs for the purpose of altering the speed of rotation of the shaft N. I have also here shown, in Figs. 5 and 6, a device, P', for registering the revolutions of the shaft F; also, in Fig. 9, I have here shown a detail of means employed to restrict the tilting motion of the box C, said means consisting of an adjustable stop, d', and and a fixed stop, c', arranged as shown with relation to the said box, the frame A, and each other. Again, the means shown and described in the said Letters Patent for facilitating the turning of the implement I have also here shown; but it is not my intention here to claim broadly any of the features of construction shown and described in the said Letters Patent. Neither, in making claim to my present improvements, do I here intend to restrict myself to an implement containing the features of construction shown and described in the said Letters Patent, my purpose being, in referring to the said Letters Patent, to indicate briefly one mode of applying my present improvements to use with advantage, and to distinguish them from those heretofore made by me and well known by others familiar with the art of constructing implements of the like class.

Having thus described my invention, what I claim as new, and desire to secure by Letters Patent, is—

1. The combination, in a wheeled grain-drill, of the tilting frame B, carrying the grain tubes and drills, the horizontal bars or treadles D D, rigidly connected at their forward ends to the said tilting parts, the horizontal tilting bars or treadles G G, jointed at their forward ends to the rear ends of the treadles D D, and the driver's seat, mounted on a tilting or vibrating standard having feet adapted and arranged for tilting the treadles G G vertically as the said standard is moved back and forth, substantially as and for the purposes specified.

2. The combination of the removable feed-shaft N, detachably connected to its driver, and the removable interior covers or boxes, O O, substantially as and for the purposes specified.

3. The combination of the laterally-yielding driving-shaft J', the rotary post N', and the hook-shaped connecting-rod O', connecting the said shaft and post, substantially as and for the purposes specified.

GEORGE G. BLUNT.

Witnesses:
F. F. WARNER,
H. FRANKFURTER.